United States Patent [19]

Sunohara et al.

[11] 4,301,900
[45] Nov. 24, 1981

[54] LOCK-UP TORQUE CONVERTER WITH CLUTCH PISTON ENGAGEABLE WITH CONVERTER COVER

[75] Inventors: Yoshio Sunohara; Kunio Ohtsuka, both of Yokohama, Japan

[73] Assignee: Nissan Motor Company, Limited, Yokohama, Japan

[21] Appl. No.: 20,310

[22] Filed: Mar. 14, 1979

[30] Foreign Application Priority Data

Apr. 4, 1978 [JP] Japan .................. 53-38855

[51] Int. Cl.³ .......................... F16D 47/06
[52] U.S. Cl. ................................. 192/3.3
[58] Field of Search .............. 192/3.3, 3.29, 3.28, 192/3.21, 3.33; 74/869, 688

[56] References Cited

U.S. PATENT DOCUMENTS

| | | | |
|---|---|---|---|
| 2,449,586 | 9/1948 | Carnagua | 192/3.29 |
| 2,793,726 | 5/1957 | Jandasek | 192/3.29 |
| 3,059,740 | 10/1962 | Roche | 192/3.28 |
| 3,189,144 | 6/1965 | Gabriel | 192/3.29 |
| 3,338,358 | 8/1967 | Christenson et al. | 192/3.3 |
| 3,497,043 | 7/1968 | Leonard | 192/3.3 |
| 3,638,771 | 2/1972 | Chana | 192/3.33 |
| 3,693,478 | 9/1972 | Malloy | 192/3.3 X |
| 3,730,315 | 5/1973 | Annis et al. | 192/3.3 |
| 3,734,251 | 5/1973 | Annis et al. | 192/3.3 |
| 3,777,863 | 12/1973 | Chana | 192/3.33 |
| 4,027,757 | 6/1977 | Radke et al. | 192/106.2 |
| 4,044,556 | 10/1977 | Kuramochi et al. | 192/3.28 X |
| 4,202,431 | 5/1980 | Yamamori et al. | 192/3.29 |

FOREIGN PATENT DOCUMENTS

| | | | |
|---|---|---|---|
| 894109 | 4/1952 | United Kingdom . | |
| 686911 | 2/1953 | United Kingdom . | |
| 774333 | 5/1957 | United Kingdom | 192/3.29 |
| 1038547 | 8/1966 | United Kingdom | 192/3.29 |
| 1084341 | 9/1967 | United Kingdom . | |
| 1212951 | 11/1970 | United Kingdom | 192/3.29 |

*Primary Examiner*—George H. Krizmanich
*Attorney, Agent, or Firm*—Schwartz, Jeffery, Schwaab, Mack, Blumenthal & Koch

[57] ABSTRACT

A lock-up torque converter includes a converter cover secured to a pump impeller and a clutch piston drivingly connected to a turbine runner. The clutch piston is engageable with the end wall of the converter cover and forms therewith a clutch chamber which is adapted to be pressurized or exhausted. A feed passageway and a discharge passageway communicate with the inside of the pump impeller and with the inside of the turbine runner, respectively, and cooperate with each other to feed a pressurized fluid into the pump impeller and to discharge the pressurized fluid from the turbine runner. A third passageway communicates with the clutch chamber and a lock-up control valve. The lock-up control valve selectively pressurizes and exhausts the clutch chamber.

2 Claims, 2 Drawing Figures

LOCK-UP TORQUE CONVERTER WITH CLUTCH PISTON ENGAGEABLE WITH CONVERTER COVER

BACKGROUND OF THE INVENTION

The present invention relates to a torque converter and more particularly to a lock-up torque converter including a direct drive clutch.

Motor vehicles installed with an automatic transmission including a torque converter give an easy drivability but are poor in fuel economy because there is a slip within the torque converter between a pump impeller thereof and a turbine runner thereof. Therefore, there have been proposed lock-up torque converters in which during a certain operation mode such as high speed engine operation where engine cyclic torque variation is small and negligible, the turbine runner will be coupled directly with the pump impeller to prevent the occurrence of slip in the torque converter thereby to improve fuel economy.

According to a lock-up torque converter disclosed in U.S. Pat. No. 3,497,043, a clutch piston drivingly connected to a turbine runner is engageable with the adjacent end wall of a converter cover secured to a pump impeller to provide a direct drive between the engine and transmission of a vehicle. Upon engagement of the clutch piston with the torque converter cover, a clutch chamber is formed therebetween. When the clutch chamber is pressurized, the clutch piston is urged against the torque converter pressure within a chamber formed by the converter cover and pump impeller out of engagement with the converter cover. When the clutch chamber is exhausted, the clutch piston is urged into engagement with the converter cover by the torque converter pressure. A lock-up control valve is provided for effecting clutch engagement or disengagement. A passageway extending partly through an output shaft communicates with the clutch chamber and with the lock-up control valve, while, another passageway extending between a stationary sleeve rotatably supporting the output shaft, and a pump driving sleeve communicates with the inside of the pump impeller and with the control valve. For effecting clutch disengagement, the control valve pressurizes the passageway communicating with the clutch chamber and exhausts the passageway communicating with the pump impeller so that a pressurized oil will flow from the clutch chamber toward the chamber of the torque converter assembly. Under a lock-up condition when the clutch engagement is required, the control valve exhausts the passageway communicating with the clutch chamber and pressurizes the passageway communicating with the pump impeller so as to create a pressure difference across the clutch piston urging the latter into engagement with the converter cover.

With the control system employed by this known torque converter, since communication between the chamber enclosing the torque converter and the clutch chamber is closed upon engagement of the clutch piston with the converter cover, the oil is confined within the chamber enclosing the torque converter and thus can not be used for lubrication of various parts of the torque converter under lock-up condition. This means that this control system must be provided independently from the conventional lubrication system.

Another problem with the known torque converter is derived from the above mentioned fact that the oil is confined within the chamber enclosing the torque converter assembly under lock-up condition which means that the oil within the torque converter can not be cooled under lock-up condition so that if the oil temperature is hot immediately before plunging into lock-up condition, the temperature within the torque converter assembly will be held high under lock-up condition.

SUMMARY OF THE INVENTION

An object of the present invention is to provide a lock-up torque converter, free from the above-mentioned problems, which includes a lock-up control system allowing circulation of oil through a chamber enclosing a torque converter assembly even under lock-up condition so that the oil discharged from the torque converter assembly may be used for lubrication of various parts of the lock-up torque converter and the associated transmission.

BRIEF DESCRIPTION OF THE DRAWINGS

Advantages and features of the present invention will become clear as the discussion proceeds as to the preferred embodiment of a lock-up torque converter in connection with the accompanying drawings.

In the accompanying drawings.

DESCRIPTION OF THE PREFERRED EMBODIMENTS

Figure 1:
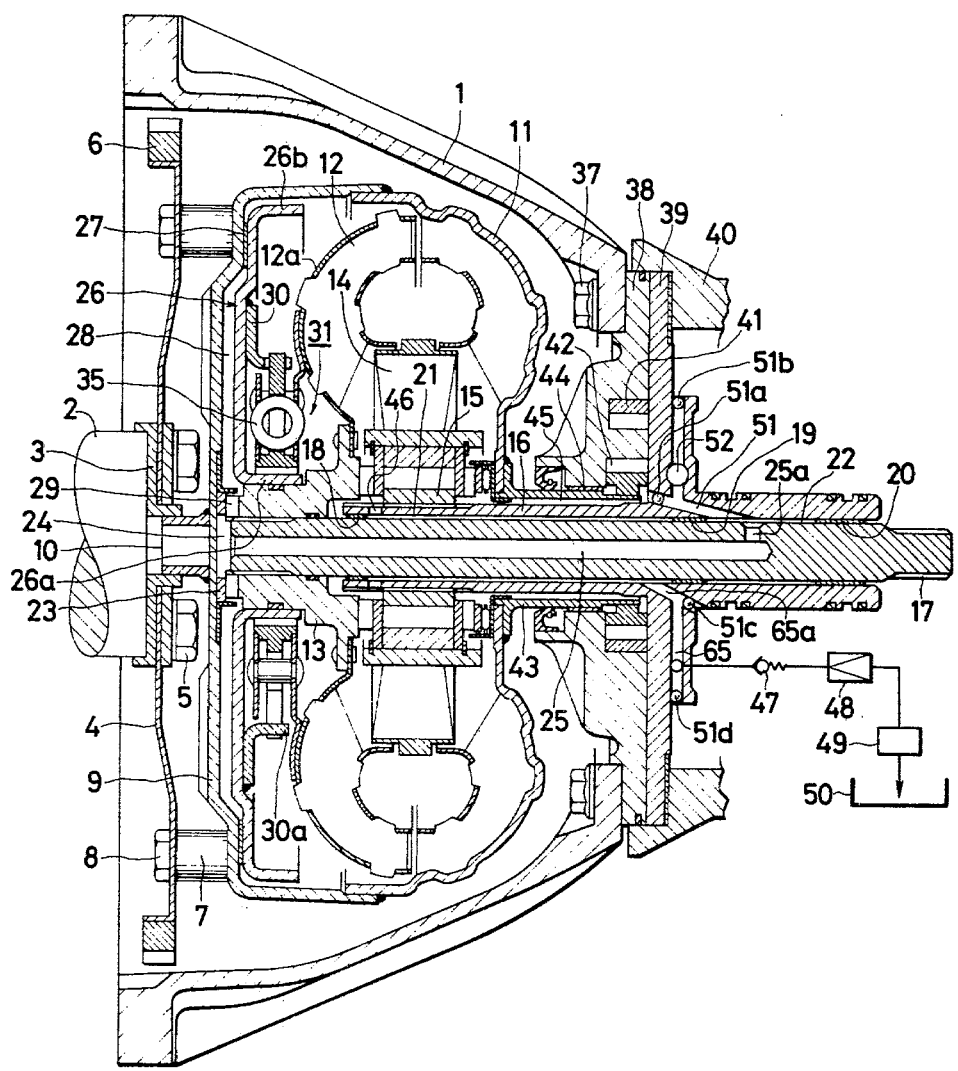
FIG. 1 is a longitudinal sectional view of the preferred embodiment of a lock-up torque converter according to the present invention together with a diagram showing an oil circuit leading from the torque converter to an oil reservoir.

Referring to FIG. 1, the reference numeral 1 designates a converter housing and the reference numeral 2 a crankshaft. A boss 3 and a drive plate 4 are concentrically secured to the end of the crankshaft 2, such as, by means of a plurality of fasteners 5. Drive plate 4 carries at its outer periphery a ring gear 6. Drive plate 4 is drivably connected to a converter cover 9 concentrically by means of a plurality of fasteners 8 using the corresponding number of spacers 7. A sleeve 10 is secured to the central portion of the converter cover 9. The sleeve 10 is received in the boss member 3 and thus the converter cover 9 is centered with respect to the crankshaft 2. Converter cover 9 has a cylindrical shape having a closed end wall adjacent the drive plate 4 and an open end. To the outer periphery of the converter cover 12 adjacent the axial end defining the open end thereof, a pump impeller 11 is secured by welding so as to be coupled with the converter cover 9. A turbine runner 12 is secured to a hub 13 at a flange thereof by rivetting. A stator 14 is situated between the pump impeller 11 and the turbine runner 12 to form a torque converter. Stator 14 is mounted to a hollow stationary sleeve 16 through a one-way clutch 15.

The stationary sleeve 16 permits an output shaft 17, which may be a transmission input shaft, to extend therethrough with an annular space or play between them. Between the stationary sleeve 16 and the output shaft 17 three spacers (bushings) 18, 19 and 20 are disposed axially spaced one after another to divide the annular space into two annular chambers 21 and 22. The hub 13 for the turbine runner 12 is splined to the output shaft 17. Between the closed end wall of the converter cover 9 and its adjacent axial end of the hub 13, an annular member or spacer 23 is disposed to define an end chamber 24. This end chamber 24 communicates with the annular chamber 22 through an axial passage 25 formed in the output shaft 17 and through a radial passage 25a formed therein.

A generally annular clutch piston 26 is slidably mounted on the hub 13 on an annular portion thereof. An annular clutch facing 27 is attached to the adjacent surface of the clutch piston 26 to the converter cover 9. When the clutch facing 27 of the clutch piston 26 engages with the adjacent surface of the end wall of the converter cover 9 upon engagement of the clutch, a clutch chamber 28 is formed between the converter cover 9 and the clutch piston 26. The clutch chamber 28 communicates with the annular chamber 24 through radial grooves or passages 29 formed at one axial end of the hub 13. Secured to the remote end wall of the clutch piston 26 is an annular mounting member 30. Within a limited space available between the inner periphery of the turbine runner 12 and the inner periphery of the clutch piston 26 a damper 31 including springs 35 is operatively connected between the clutch piston 26 and the hub 13 to provide a driving connection.

The construction of the clutch piston 26 and that of the annular mounting member 30 will be described hereinafter. The clutch piston 26 is die formed from a piece of sheet metal and includes an inner axially extending flange 26a and an outer axially extending, in the same direction, flange 26b. The clutch piston 26 is slidably mounted by the inner axially extending flange 26a on the hub 13. The outer axially extending flange 26b is formed for reinforcement purpose of the annular portion of the clutch piston 26 which will be subjected to difference, in pressure, upon engagement of the lock-up clutch. The annular mounting member 30 has a plurality of inner axially extending circumferentially spaced mounting legs 30a.

The remote open end of the converter housing 1 from the crankshaft 2 is secured to a pump housing 38 which in turn is secured to a pump cover 39 secured to a transmission case 40 by means of fasteners 37. The pump cover 39 extends radially from the stationary sleeve 16. Within the pump housing 38, oil pump elements including an outer gear 41 and an inner gear 42 are operatively disposed. A pump driving sleeve 43 extends into the pump housing 38 and journalled thereby by means of a bushing 44. The pump driving sleeve 43 permits the stationary sleeve 16 to extend therethrough, and has one axial end drivingly connected to the pump impeller 11 and has an opposite end splined to the inner gear pump element 42. The pump driving sleeve 43 is spaced from and surrounds a portion of the stationary sleeve 16 to form with the latter an oil feed passge 45. The oil feed passage 45 communicates with the inside of the pump impeller 11 of the torque converter assembly.

Radial passages 46 formed through the stationary sleeve 16 provide communication between the inside of the turbine runner 12 and the annular chamber 21. The annular chamber 21 communicates with an inclined passage 65a formed in the pump cover 39 which in turn communicates with a passage 65 formed therein. This passage 65 communicates with a pressure maintaining valve 47. With the pressure maintaining valve 47, the pressure within the torque converter assembly is maintained at a predetermined level. The pressure maintaining valve 47 communicates with an oil cooler 48 communicating in turn with various parts 49 which require lubrication and with an oil reservoir 50.

The annular chamber 22 communicates with an inclined passage 51 (where the reference numerals 51a and 51b designate fit-in balls) formed in the pump cover 39 which in turn communicates with a lock-up control valve 52 mounted within the pump cover 39. The control valve 52 has the function to selectively pressurizes or exhaust the passage 51.

Figure 2:
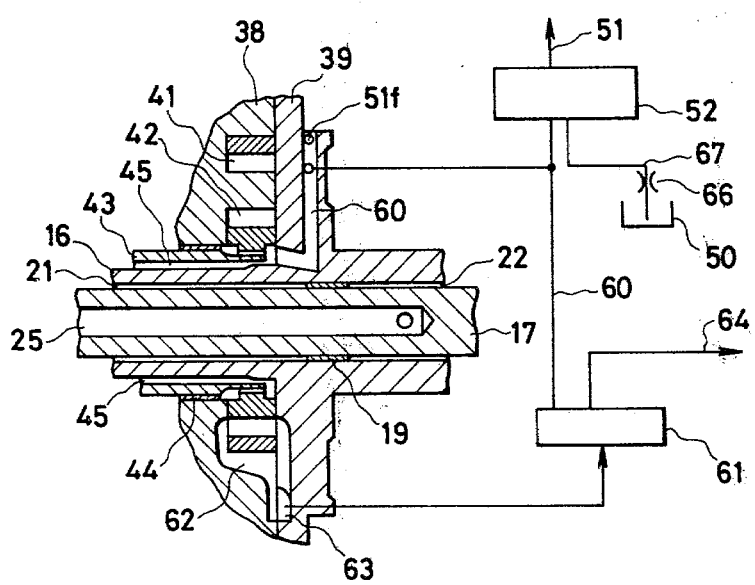
FIG. 2 is a circuit diagram explaining the operation of a lock-up control valve.

Referring to FIG. 2, a discharge passage 63 provides communication between the discharge side 62 of the pump and a pressure regulator valve 61 which provides a so-called line pressure at a passage 64 selectively communicable with various servos of a hydraulic control system for a transmission mechanism to which an input power is fed by the output shaft 17. The oil displaced upon regulating function within the pressure regulator valve 61 is discharged into a passage 60. This passage 60 communicates with the passage 45 which communicates with the inside of the pump impeller 11.

Although only diagrammatically shown in FIG. 2, the control valve 52 is responsive to a pressure signal representing a predetermined condition in which a lock-up of the torque converter is desirable to take a first position in which the passage 51 (see FIG. 1 also) is connected to a drain passage 67 provided with a flow restrictor 66 so that the passage 51 is exhausted. Under the other condition, the control valve 52 takes a second position in which the passage 51 is connected to the passage 60 so that the passage 51 is pressurized.

It will now be understood from the preceeding description and the insepection of FIGS. 1 and 2 that pressurized oil will flow into the pump impeller 11 through the passage 60 (see FIG. 2) formed in the pump cover 39 and the passage 45 between the stationary sleeve 16 and the pump driving sleeve 43, and the oil will flow out of the turbine runner 12 toward the oil cooler 48 through the radial passages 46 formed in the stationary sleeve 16, the annular chamber 21, the inclined passage 65a, the radial passage 65 and the pressure maintaining valve 47.

It will also be understood that the control valve 52 communicates with the clutch chamber 28 through the inclined passage 51, the annular chamber 22, the radial passage 25a, the axial passage 25, the end chamber 24 and the radial passages 29.

The operation of the torque converter according to the invention will be understood from the following description.

The rotation of the crankshaft 2 is always delivered to the pump impeller 11 through the drive plate 4, the fasteners 8 and the converter cover 9. The rotation of the pump impeller 11 is delivered through the pump driving sleeve 43 to the pump element inner gear 42. Thus the oil pump operates as long as the engine operates.

When the vehicle operating condition does not satisfy a predetermined condition in which lock-up clutch engagement is required, the control valve 52 permits the passage 51 to be pressurized. Meanwhile, oil is supplied to the inside of the pump impeller 11. The oil in the inside of the torque converter assembly flows out of the turbine runner 12. The oil discharged from the turbine runner 12 flows toward the pressure maintaining valve 47, thus the pressure within the torque converter assebmly being maintained at a certain level determined by the pressure maintaining valve 47. This pressure, i.e., the pressure within the torque converter assembly, is transmitted through the lock-up control valve 52, the passages 51 and 25, the chamber 24 and radial passage 29 to the clutch chamber 28. Thus, the clutch piston 26 is held disengaged from the converter cover 9 when the clutch chamber 28 is pressurized.

Under this condition, the torque converter will perform its torque multiplying function because the oil maintained at the certain pressure will transmit the torque under the reaction of the stator 14 from the pump impeller 11 to the turbine runner 12.

The oil after flowing through the pressure maintaining valve 47 will flow to the oil cooler 48 installed within the lower tank of the radiator. After being cooled by the oil cooler 48, the oil will be distributed to the various parts or portions to be lubricated in the transmission and thereafter flow back to the oil reservoir 50, i.e., the oil pan of the transmission. The oil pump including the gears 41 and 42 will draw oil from this oil reservoir 50.

When the vehicle operating condition satisfies the predetermined condition, for example, when the vehicle operates at speeds above a predetermined speed in the highest gear, the control valve 52 will permit the passage 51 to be exhausted. This will cause the oil within the clutch chamber 28 to be exhausted through the radial passages 29, the end chamber 24, the oil passage 25, the oil passage 51 and through the control valve 52 so that the clutch piston 26 will be urged toward the left (viewing in FIG. 1) to engage with the converter cover 9 under the influence of the difference in pressure created between the both sides of the clutch piston 26. When the clutch facing 27 attached to the clutch piston 26 firmly engages with the converter cover 9, the piston 26 will be directly connected to the converter cover 9 which in turn is connected to the crankshaft 2 and the pump impeller 11 to rotate with them as a unit. The rotation of the clutch piston 26 is transmitted to the turbine runner 12 mechanically through the damper 31. The impact upon initiation of the transmission of the rotational torque will be absorbed by the springs 35. Thus, the damper 31 will transmit the torque while suppressing the impact which otherwise would take place upon change in magnitude of the torque transmitted therethrough. In this manner, the turbine runner 12 is directly connected to the crankshaft 2 and the pump impeller 11 through the damper 31, the clutch piston 26 and the converter cover 9.

What is claimed is:

1. In a lock-up torque converter the combination of:
an input member;
a converter cover driven by said input member;
a pump impeller secured to said converter cover and forming therewith a chamber;
an output shaft;
a turbine runner within said chamber connected to said output shaft;
a clutch piston mounted within said chamber and drivingly connected to said turbine runner;
said clutch piston being engageable with said converter cover to lock said turbine runner with said pump impeller and forming therewith a clutch chamber only when said clutch piston is in engagement with said converter cover;
a converter housing surrounding said converter cover;
a stationary sleeve fixed to said converter housing so as to surround part of said output shaft, said part of said output shaft having a uniform diameter;
first, second and third plain non-perforate bushes disposed on said uniform diameter part of said output shaft at spaced intervals therealong for journalling it in said stationary sleeve member and defining between said output shaft and said stationary sleeve first and second closed annular chambers, said first chamber being defined between said first and second bushes and said second chamber being defines between said said second and third bushes, said first, second and third bushes having the same radial dimensions;
said output shaft being formed with an elongate blind bore which fluidly communicates with said clutch chamber;
said output shaft being also formed with a radial passage fluidly communicating said elongate bore with said second chamber;
a lock-up valve;
first passage means fluidly communicating said lock-up valve and said second chamber;
second passage means for providing fluid communication with the inside of said pump impeller; and
third passage means for providing fluid communication with the inside of said turbine runner, said third passage means including said first chamber and communicating with said second passage means for circulating fluid discharged from said turbine runner to said second passage means for reintroduction into said pump impeller.

2. A combination as claimed in claim 1, further comprising:
an oil cooler which fluidly communicates with said third passage.

* * * * *